(12) United States Patent
Benjamin et al.

(10) Patent No.: US 11,567,283 B2
(45) Date of Patent: Jan. 31, 2023

(54) OPTICAL FIBRE RIBBON AND OPTICAL FIBRE CABLES THEREOF

(71) Applicant: Sterlite Technologies Limited, Aurangabad (IN)

(72) Inventors: Seldon Benjamin, Spring, TX (US); Kishore Sahoo, Aurangabad (IN); Manoj Mittal, Aurangabad (IN); Venkatesh Murthy, Aurangabad (IN); Sravan Kumar, Aurangabad (IN); Hemanth Kondapalli, Aurangabad (IN)

(73) Assignee: Sterlite Technologies Limited, Haryana (IN)

( * ) Notice: Subject to any disclaimer, the term of this patent is extended or adjusted under 35 U.S.C. 154(b) by 271 days.

(21) Appl. No.: 16/785,907

(22) Filed: Feb. 10, 2020

(65) Prior Publication Data

US 2020/0257069 A1 Aug. 13, 2020

(30) Foreign Application Priority Data

Feb. 11, 2019 (IN) .............................. 201921005343

(51) Int. Cl.
*G02B 6/44* (2006.01)

(52) U.S. Cl.
CPC .................................. *G02B 6/448* (2013.01)

(58) Field of Classification Search
CPC ...................................................... G02B 6/448
USPC ........................................................ 264/1.28
See application file for complete search history.

(56) References Cited

U.S. PATENT DOCUMENTS 6,097,866 A * 8/2000 Yang .................... G02B 6/4411
385/114
2017/0090126 A1 * 3/2017 Lu ........................ G02B 6/3821

* cited by examiner

*Primary Examiner* — Jerry M Blevins
(74) *Attorney, Agent, or Firm* — Steven R. Fairchild; Michael J. Pennington

(57) ABSTRACT

The present disclosure provides a method for stacking of a plurality of optical fibre ribbons (106). The plurality of optical fibre ribbons (106) is defined by a top surface (S1) and a bottom surface (S2). The top surface (S1) and bottom surface (S2) are defined by a plurality of elevated regions and a plurality of groove regions. The method for stacking of the plurality of optical fibre ribbons (106) includes arranging the plurality of optical fibre ribbons (106) over each other such that the plurality of elevated regions of each of the plurality of optical fibre ribbons fits over the plurality of groove regions of an adjacent optical fibre ribbon of the plurality of optical fibre ribbons (106). In addition, arrangement of the plurality of optical fibre ribbons forms an optical fibre ribbon stack (200).

6 Claims, 9 Drawing Sheets

OPTICAL FIBRE RIBBON AND OPTICAL FIBRE CABLES THEREOF

TECHNICAL FIELD

The present disclosure relates to the field of optical fibre ribbons and, in particular, relates to an optical fibre ribbon stack. The present application is based on, and claims priority from an Indian Application Number 201921005343 filed on 11 Feb. 2019, the disclosure of which is hereby incorporated by reference herein.

BACKGROUND

With the advancement of science and technology, various modern technologies are being employed for communication purposes. One of the most important modern communication technologies is the optical fibre communication technology using a variety of optical fibre cables. One such type of optical fibre cables are optical fibre ribbon cables. These optical fibre ribbon cables may include a large number of optical fibre ribbons and may have a large diameter that makes the optical fibre ribbon cable difficult to install in ducts having a small diameter. Each optical fibre ribbon includes a number of optical fibres placed adjacent and bonded together with a matrix material. The currently available optical fibre ribbons have certain drawbacks. Cables made with existing optical fibre ribbons have a larger diameter causing installation of optical fibre ribbon cable in ducts to become difficult.

In light of the foregoing discussion, there exists a need for an optical fibre ribbon which overcomes the above cited drawbacks of conventionally known optical fibre ribbons.

OBJECT OF THE DISCLOSURE

A primary object of the present disclosure is to provide a method for stacking of a plurality of optical fibre ribbons to form an optical fibre ribbon stack.

Another object of the present disclosure is to provide the optical fibre ribbon that is easy to deploy in an optical fibre cable.

Yet another object of the present disclosure is to provide the optical fibre ribbon which can bend easily at non-preferential axis.

Yet another object of the present disclosure is to provide the optical fibre ribbon with increased fibre density.

SUMMARY

In an aspect the present disclosure provides a method for stacking of a plurality of optical fibre ribbons. Each optical fibre ribbon of the plurality of optical fibre ribbons is defined by a top surface (S1) and a bottom surface (S2). In addition, the top surface (S1) and the bottom surface (S2) are defined by a plurality of elevated regions and a plurality of groove regions. Further, the plurality of elevated regions and the plurality of groove regions are alternate to each other. Furthermore, the method for stacking of the plurality of optical fibre ribbons includes arranging the plurality of optical fibre ribbons over each other such that the plurality of elevated regions of each of the plurality of optical fibre ribbons fits over the plurality of groove regions of an adjacent optical fibre ribbon of the plurality of optical fibre ribbons. Moreover, arrangement of the plurality of optical fibre ribbons forms an optical fibre ribbon stack.

In an embodiment of the present disclosure, the plurality of optical fibre ribbons of the optical fibre ribbon stack is arranged such that each optical fibre ribbon of the plurality of optical fibre ribbons is offset by half value of pitch of each optical fibre ribbon of the plurality of optical fibre ribbons.

In an embodiment of the present disclosure, each of the plurality of optical fibre ribbons comprises a plurality of optical fibres. In addition, each of the plurality of optical fibres is coated with a matrix material. Further, the matrix material on each of the plurality of optical fibres is characterised by a radius of curvature. Furthermore, the radius of curvature of the matrix material on each of the plurality of optical fibres in each of the plurality of optical fibre ribbons is same.

In an embodiment of the present disclosure, each of the plurality of optical fibre ribbons (106) has 12 optical fibres.

In an embodiment of the present disclosure, the arrangement of the plurality of optical fibre ribbons is dependent of diameter of each of the plurality of optical fibres, a radius of curvature of the matrix material and pitch of the plurality of optical fibers in the optical fibre ribbon.

In an embodiment of the present disclosure, each of the plurality of optical fibre ribbons is capable of bending along non-preferential axis.

In an embodiment of the present disclosure, the optical fibre ribbon stack is characterized by height. In addition, height of the optical fibre ribbon stack is about 3170 micrometers.

STATEMENT OF THE DISCLOSURE

The present disclosure relates to a method for stacking of a plurality of optical fibre ribbons. Each optical fibre ribbon of the plurality of optical fibre ribbons is defined by a top surface (S1) and a bottom surface (S2). In addition, the top surface (S1) and the bottom surface (S2) are defined by a plurality of elevated regions and a plurality of groove regions. Further, the plurality of elevated regions and the plurality of groove regions are alternate to each other. Furthermore, the method for stacking of the plurality of optical fibre ribbons includes arranging the plurality of optical fibre ribbons over each other such that the plurality of elevated regions of each of the plurality of optical fibre ribbons fits over the plurality of groove regions of an adjacent optical fibre ribbon of the plurality of optical fibre ribbons. Moreover, arrangement of the plurality of optical fibre ribbons forms an optical fibre ribbon stack.

BRIEF DESCRIPTION OF FIGURES

Figure 1:
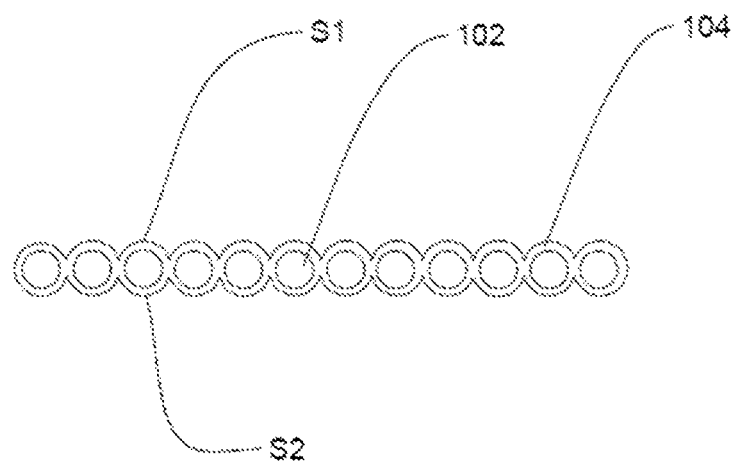
Figure 2:
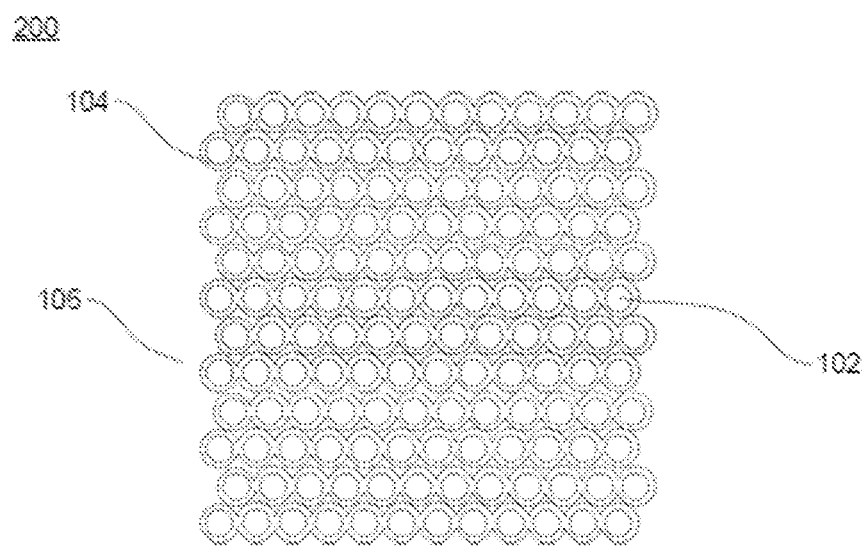
Figure 3:
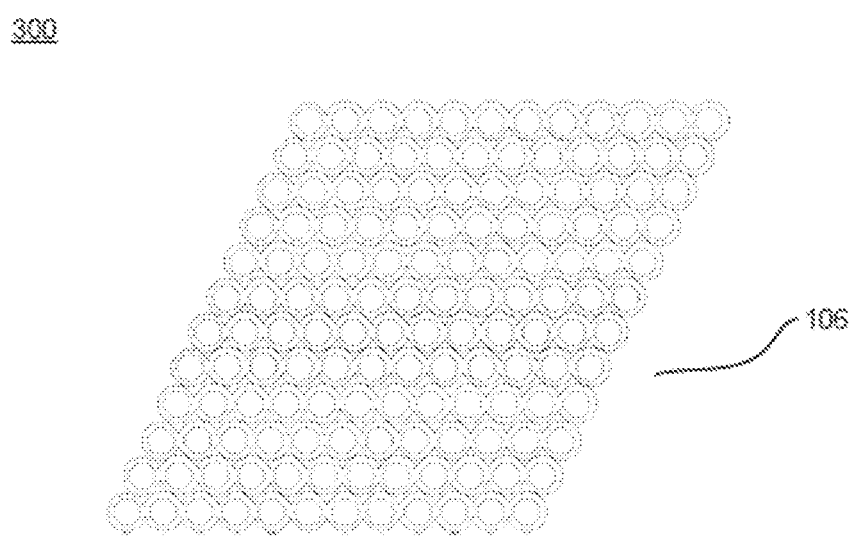
Figure 4:
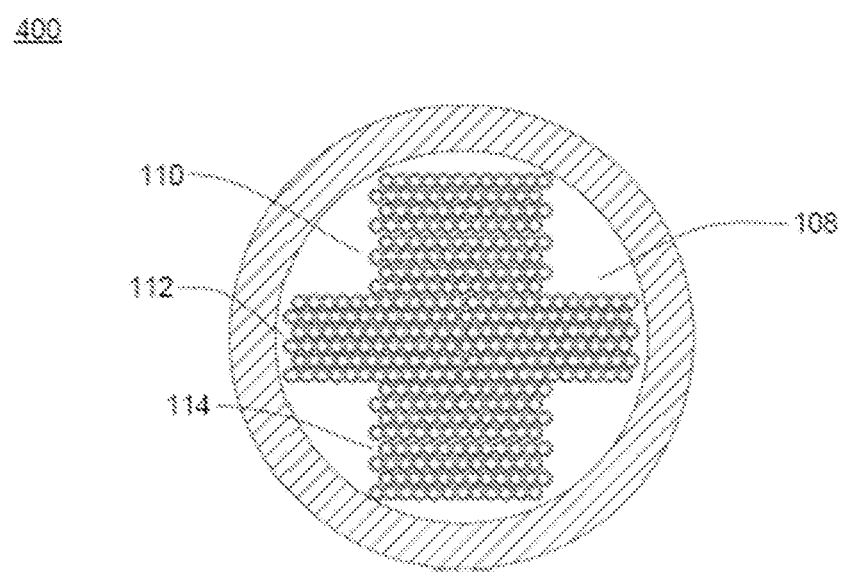
Figure 5:
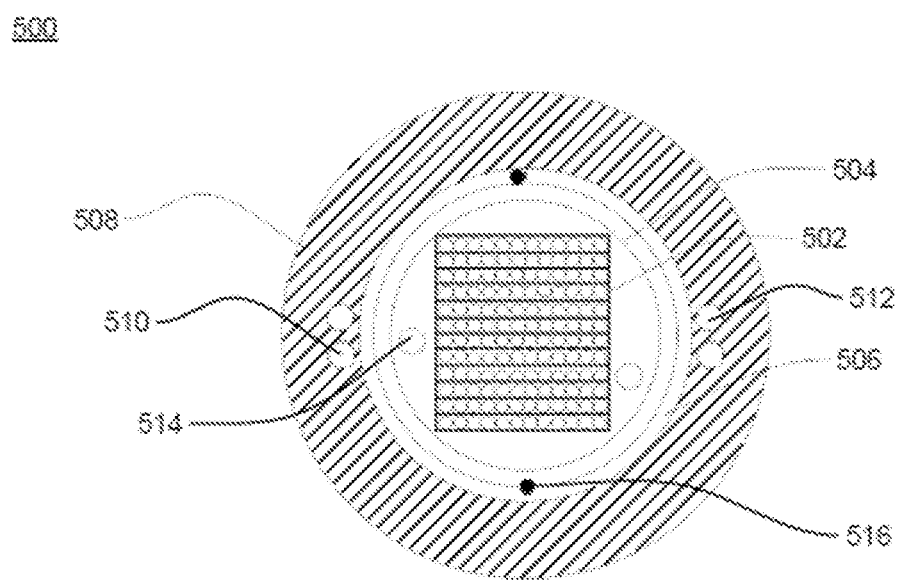
Figure 6:
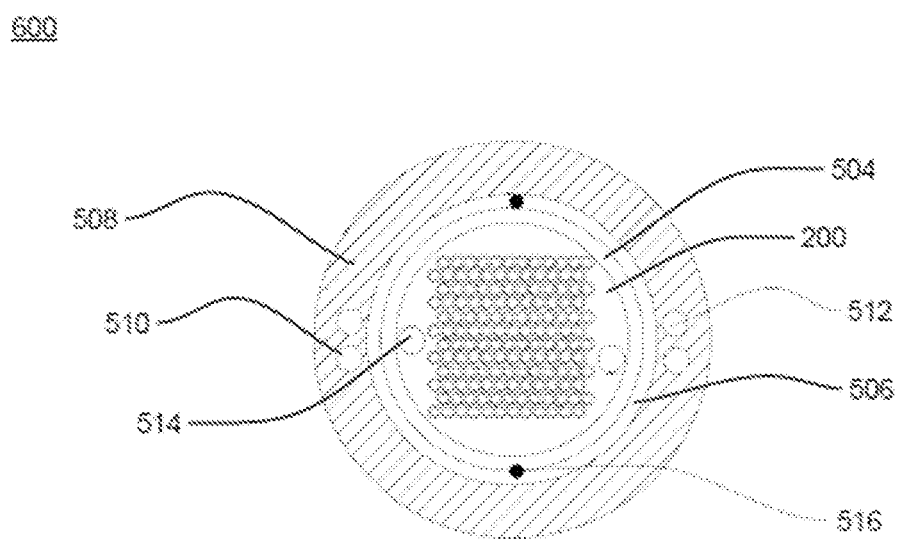
Figure 7:
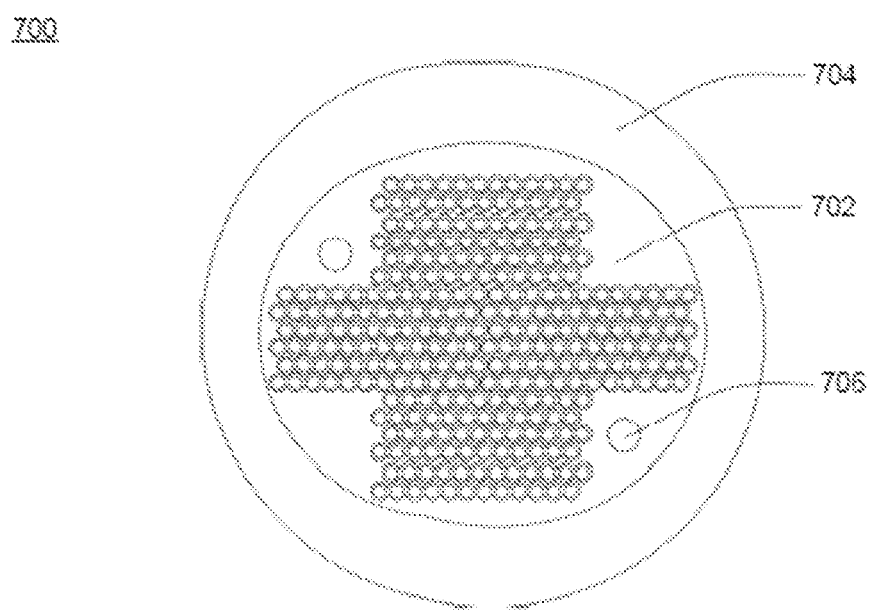
Figure 8:
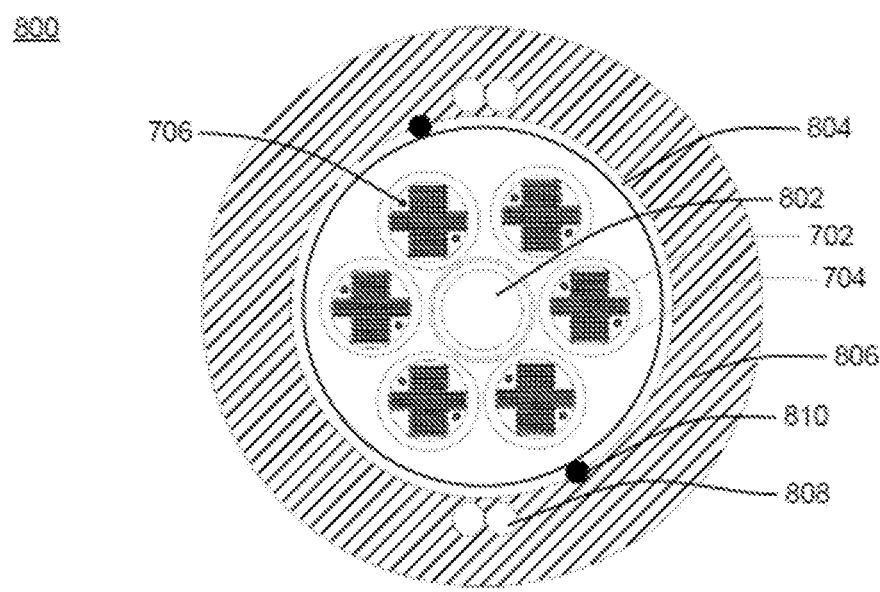
Figure 9:
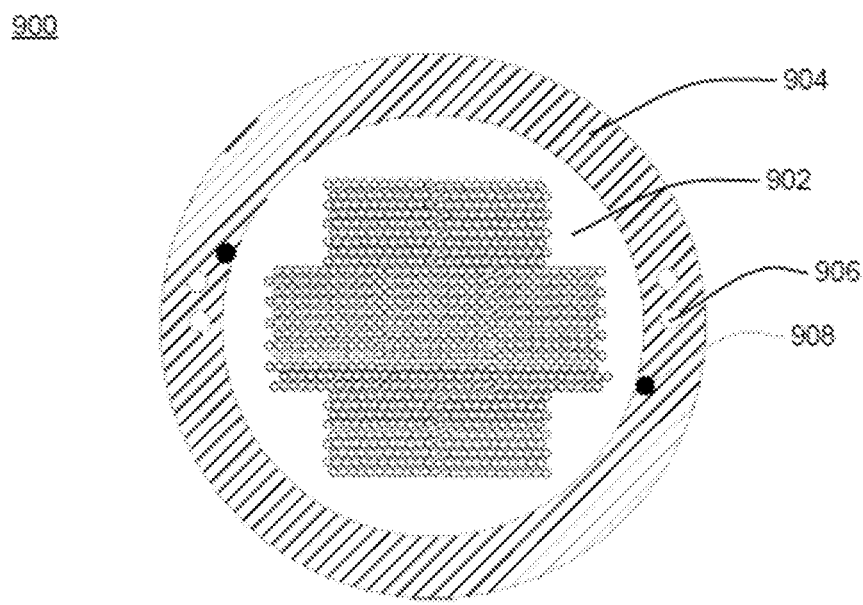

Having thus described the disclosure in general terms, reference will now be made to the accompanying figures, wherein:

FIG. 1 illustrates an optical fibre ribbon, in accordance with an embodiment of the present disclosure;

FIG. 2 illustrates an optical fibre ribbon stack, in accordance with an embodiment of the present disclosure;

FIG. 3 illustrates a parallelogram shaped ribbon stack, in accordance with an embodiment of the present disclosure;

FIG. 4 illustrates an optical fibre ribbon cable with a first plus sign shaped ribbon stack, in accordance with an embodiment of the present disclosure;

FIG. 5 illustrates a conventional optical fibre cable with conventional optical fibre ribbon stack;

FIG. 6 illustrates an example of optical fibre cable with the optical fibre ribbon stack of FIG. 2, in accordance with an embodiment of the present disclosure;

FIG. 7 illustrates an optical module assembly having a form fitting soft tube with a second plus sign shaped ribbon stack, in accordance with an embodiment of the present disclosure;

FIG. 8 illustrates a fibre cable with a plurality of form fitting tubes, in accordance with an embodiment of the present disclosure; and FIG. 9 illustrates a cross sectional view of an optical fibre cable with a third plus sign shaped ribbon stack, in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates an optical fibre ribbon 100, in accordance with an embodiment of the present disclosure. In general, optical fibre ribbons are made of number of optical fibres. The optical fibre ribbon 100 includes a plurality of optical fibres 102 and a matrix material 104.

The optical fibre ribbon 100 is defined by a top surface S1 and a bottom surface S2. The top surface S1 and the bottom surface S2 are defined by a plurality of elevated regions and a plurality of groove regions. In addition, the plurality of elevated regions and the plurality of groove regions are alternate to each other. The optical fibre ribbon 100 includes the plurality of optical fibres 102. In general, optical fibre is a medium associated with transmission of information over long distances in the form of light pulses. In addition, optical fibre is a type of cabling technology that uses light to transmit voice and data communications over long distances. In an embodiment of the present discourse, the optical fibre ribbon 100 has 12 optical fibres. In another embodiment of the present disclosure, the optical fibre ribbon 100 may have any number of optical fibres. In an embodiment of the present disclosure, each of the plurality of optical fibres 102 has a diameter of about 200 micrometers. In another embodiment of the present disclosure, the diameter of each of the plurality of optical fibres 102 may vary. In an embodiment of the present disclosure, the plurality of optical fibres 102 is aligned at pitch of about 250 micrometers. In another embodiment of the present disclosure, the plurality of optical fibres 102 is aligned at any suitable pitch. In general, pitch is distance between geometrical centers of any two optical fibres lying adjacent to each other. Further, each of the plurality of optical fibres is coated with the matrix material 104. In general, matrix material provides various handling characteristics to the optical fibre ribbons. The various handling characteristics include encapsulation, easy peel and breakout, robustness and the like. In an embodiment of the present disclosure, the matrix material 104 has thickness of about 50 micrometers. In another embodiment of the present disclosure, thickness of the matrix material 104 may vary. In an embodiment of the present disclosure, the matrix material 104 is characterized by a radius of curvature.

FIG. 2 illustrates an optical fibre ribbon stack 200, in accordance with an embodiment of the present disclosure. The optical fibre ribbon stack 200 incudes a plurality of optical fibre ribbons 106. Each of the plurality of optical fibre ribbons 106 is defined by the top surface S1 and the bottom surface S2. The top surface S1 and the bottom surface S2 are defined by the plurality of elevated regions and the plurality of groove regions. The plurality of optical fibre ribbons 106 is arranged over each other such that the plurality of elevated regions of each of the plurality of optical fibre ribbons 106 fits over the plurality of groove regions of an adjacent optical fibre ribbon of the plurality of optical fibre ribbons 106. In addition, arrangement of the plurality of optical fibre ribbons 106 over each other forms the optical fibre ribbon stack 200. In an embodiment of the present disclosure, the plurality of optical fibre ribbons 106 of the optical fibre ribbon stack 200 is arranged such that each optical fibre ribbon 100 of the plurality of optical fibre ribbons 106 is offset by half value of pitch of each optical fibre ribbon 100 of the plurality of optical fibre ribbons 106.

In addition, each of the plurality of optical fibre ribbons 106 includes the plurality of optical fibres 102. Each of the plurality of optical fibres 102 is coated with the matrix material 104. The matrix material 104 on each of the plurality of optical fibres 102 is characterised by the radius of curvature. The radius of curvature of the matrix material 104 on each of the plurality of optical fibres 102 in each of the plurality of optical fibre ribbons 106 is same.

Further, arrangement of the plurality of optical fibre ribbons 106 over each other reduces height of the optical fibre ribbon stack 200 and increases density of the plurality of optical fibres 102. The height of the optical fibre ribbon stack 200 is less than the sum of heights of individual ribbons of the plurality of optical fibre ribbons 106. In an embodiment of the present disclosure, the height of the optical fibre ribbon stack 200 is about 3170 micrometers. In another embodiment of the present disclosure, the height of the optical fibre ribbon stack 200 may vary. In an embodiment of the present disclosure, the optical fibre ribbon stack 200 has high packing efficiency of the plurality of optical fibre ribbons 106. In an embodiment of the present disclosure, width of the optical fibre ribbon stack 200 is about 3175 micrometers. In another embodiment of the present disclosure, width of the optical fibre ribbon stack 200 may vary. In an embodiment of the present disclosure, each ribbon of the plurality of optical fibre ribbons 106 has thickness of about 300 micrometers. In another embodiment of the present disclosure, thickness of each ribbon of the plurality of optical fibre ribbons 106 may vary. In an embodiment of the present disclosure, pitch of the plurality of optical fibre ribbons 106 of the optical fibre ribbon stack 200 is about 260 micrometers. In another embodiment of the present disclosure, pitch of the plurality of optical fibre ribbons 106 of the optical fibre ribbon stack 200 may vary.

Furthermore, arrangement of the plurality of optical fibre ribbons 106 is dependent of diameter of each of the plurality of optical fibres 102, the radius of curvature of the matrix material 104 and pitch of the plurality of optical fibers 102 in the optical fibre ribbon 106. In an embodiment of the present disclosure, the plurality of optical fibre ribbons 106 have high flexibility. In addition, each of the plurality of optical fibre ribbons 106 is capable to bend along non-preferential axis. Further, bending of each of the plurality of optical fibre ribbons 106 along non-preferential axis allows easy installation in space constrained regions.

FIG. 3 illustrates a parallelogram shaped ribbon stack 300, in accordance with an embodiment of the present disclosure. In general, a parallelogram is a quadrilateral with two pairs of parallel sides. In general, opposite or facing sides of the parallelogram are of equal length and opposite angles of the parallelogram are of equal measure. The parallelogram shaped ribbon stack 300 is easy to deploy in cables and efficiently fill up the space in cables.

FIG. 4 illustrates an optical fibre ribbon cable 400 with a first plus sign shaped ribbon stack 108, in accordance with an embodiment of the present disclosure. In an embodiment of the present disclosure, optical fibre ribbon cable may be of central tube construction. The optical fibre cable is easy to install in space constrained regions. In addition, the optical fibre ribbon cable has reduced diameter.

The optical fibre ribbon cable 400 includes the first plus sign shaped ribbon stack 108. The first plus sign shaped ribbon stack 108 fills the optical fibre ribbon cable 400 efficiently. The first plus sign shaped ribbon stack 108 includes a first section 110 of the plurality of optical fibre ribbons 106, a second section 112 of the plurality of optical fibre ribbons 106 and a third section 114 of the plurality of optical fibre ribbons 106. Further, number of the plurality of optical fibre ribbons 106 of the first section 110 of the first plus sign shaped ribbon stack 108 is 8. Each of the plurality of optical fibre ribbons 106 of the first section 110 have 12 optical fibres. In an embodiment of the present disclosure, number of the plurality of optical fibre ribbons 106 of the second section 112 is 6. In addition, each ribbon of the plurality of optical fibre ribbons 106 of the second section 112 has 24 optical fibres. In another embodiment of the present disclosure, the number of the plurality of optical fibre ribbons 106 of the second section 112 is 12. In addition, each ribbon of the plurality of optical fibre ribbons 106 of the second section 112 includes 12 optical fibres. Further, arrangement of the first section 110 of the plurality of optical fibre ribbons 106, the second section 112 of the plurality of optical fibre ribbons 106 and the third section 114 of the plurality of optical fibre ribbons 106 serves to hold the plurality of 12 fibre ribbons 106 in the second section 112 in alignment to form the first plus sign shaped ribbon stack 108. Furthermore, the second section 112 of the first plus sign shaped ribbon stack 108 is central section of the first plus sign shaped ribbon stack 108. Moreover, number of the plurality of optical fibre ribbons 106 of the third section 114 of the first plus sign shaped ribbon stack 108 is 8. Each ribbon of the plurality of optical fibre ribbons 106 of the first section 110 includes 12 optical fibres. In an embodiment of the present disclosure, number of the plurality of optical fibres 102 in the central tube 400 is 336. In another embodiment of the present disclosure, number of the plurality of optical fibres 102 in the optical fibre ribbon cable 400 may vary.

FIG. 5 illustrates a conventional optical fibre cable 500 with a conventional optical fibre ribbon stack 502. The conventional optical fibre cable 500 includes a module 504, a water blocking tape 506 and a sheath 508. In addition, the optical fibre cable 500 includes a first set of embedded strength members 510, a second set of embedded strength members 512 and a plurality of ripcords 516.

The module 502 includes the conventional optical fibre ribbon stack 502.

The conventional optical fibre ribbon stack 502 has a rectangular shape. In addition, the conventional optical fibre ribbon stack 502 includes a plurality of optical ribbons. Each of the plurality of optical ribbons include 12 fibres. Further, number of the plurality of optical ribbons of the conventional optical fibre ribbon stack 502 is 12. Furthermore, total number of optical fibres in the conventional optical fibre ribbon stack 502 is 144.

In an embodiment of the present disclosure, the height of the optical fibre ribbon stack 502 is about 3720 micrometers. In another embodiment of the present disclosure, the height of the optical fibre ribbon stack 502 may vary. In an embodiment of the present disclosure, width of the optical fibre ribbon stack 502 is about 3200 micrometers. In another embodiment of the present disclosure, width of the optical fibre ribbon stack 502 may vary. The water blocking tape 506 surrounds the stack 502. Further, the sheath 508 surrounds the water blocking tape 506. Furthermore, the sheath 508 is made of polyethylene material. In an embodiment of the present disclosure, the optical fibre cable 500 has an inner diameter of about 6.6 mm. In another embodiment of the present disclosure, the inner diameter of the optical fibre cable 500 may vary. In an embodiment of the present disclosure, the optical fibre cable 500 has an outer diameter of about 10.6 mm. In another embodiment of the present disclosure, the outer diameter of the optical fibre cable 600 may vary.

FIG. 6 illustrates an optical fibre cable 600 with the optical fibre ribbon stack 200 of FIG. 2, in accordance with an embodiment of the present disclosure. The optical fibre cable 600 is modified optical fibre cable of the conventional optical fibre cable 500.

In an embodiment of the present disclosure, the optical fibre cable 600 includes the optical fibre ribbon stack 200 (as shown in FIG. 2). In addition, arrangement of the optical fibre ribbon stack 200 of the optical fibre cable 600 reduces height of the optical fibre ribbon stack 200. Further, the optical fibre ribbon stack 200 of the optical fibre cable 600 includes 144 optical fibres. In another embodiment of the present disclosure, the optical fibre cable 600 may include the parallelogram shaped ribbon stack 300 of FIG. 3 in place of the optical fibre ribbon stack 200. In an embodiment of the present disclosure, the optical fibre cable 600 has an inner diameter of about 6.2 mm. In another embodiment of the present disclosure, the inner diameter of the optical fibre cable 600 may vary. In an embodiment of the present disclosure, the optical fibre cable 600 has an outer diameter of about 10.2 mm. In another embodiment of the present disclosure, the outer diameter of the optical fibre cable 600 may vary.

FIG. 7 illustrates an optical module assembly 700 having a form fitting soft tube 704 with a second plus sign shaped ribbon stack 702, in accordance with an embodiment of the present disclosure.

The form fitting soft tube 704 includes the second plus sign shaped ribbon stack 702 and a plurality of water blocking yarns 706. In an embodiment of the present disclosure, the second plus sign shaped ribbon stack 200 includes the plurality of optical fibre ribbons 106. In an embodiment of the present disclosure, number of the plurality of optical fibre ribbons 106 in the second plus sign shaped ribbon stack 702 is 24. Each optical fibre ribbon has 12 optical fibres. In another embodiment of the present disclosure, number of the plurality of optical fibre ribbons 106 in the second plus sign shaped ribbon stack 702 is 12. Further, total number of optical fibres in the second plus sign shaped ribbon stack 702 corresponding to 24 ribbons is 288. Furthermore, total number of optical fibres in the second plus sign shaped ribbon stack 702 corresponding to 12 ribbons is 144.

The form filling soft tube 704 includes the plurality of water blocking yarns 706. In general, water blocking yarns prevent ingression of water in optical cables.

FIG. 8 illustrates a fibre cable 800 with a plurality of form fitting soft tubes, in accordance with an embodiment of the present disclosure. The fibre cable 800 includes a central strength member 802, the plurality of form fitting soft tubes, a first layer 804, a second layer 806, a plurality of strength members 808 and at least two ripcords 810.

In an embodiment of the present disclosure, the central strength member 802 is coated with a water swellable tape. Further, the plurality of form fitting soft tubes surrounds the central strength member 802. In an embodiment of the present disclosure, number of the form fitting soft tube 704 (of FIG. 7) in the plurality of form fitting soft tubes of the fibre cable 800 is six. Each form fitting soft tube 704 of the plurality of form fitting soft tubes includes the second plus sign shaped ribbon stack 702 and the plurality of yarns 706 (as shown in FIG. 7). In an embodiment of the present disclosure, In an embodiment of the present disclosure, the second plus sign shaped ribbon stack 702 of each form fitting soft tube 704 of the plurality of form fitting soft tubes includes 24 ribbons. Each ribbon of the plurality of optical fibre ribbons 106 includes 12 optical fibres. In another embodiment of the present disclosure, the second plus sign shaped ribbon stack 702 of each form fitting soft tube 704 of the plurality of form fitting soft tubes includes 12 ribbons. Furthermore, total number of optical fibres in the fibre cable 800 corresponding to 24 ribbons is 1728. Furthermore, total number of optical fibres in the fibre cable 800 corresponding to 12 ribbons is 864.

The fibre cable 800 includes the first layer 804. The first layer 804 includes binders and a water swellable tape. The water swellable tape prevents ingression of water inside each form fitting soft tube 704 of the plurality of form fitting tubes. Further, the second layer 806 surrounds the first layer 804. The second layer 806 is an ultraviolet proof jacket. In an embodiment of the present disclosure, the second layer 806 is made of polyethylene material. In another embodiment of the present disclosure, the second layer 806 is made of any suitable material.

Furthermore, the fibre cable 800 includes the plurality of strength members 808. Each of the plurality of strength members 808 is embedded in the fibre cable 800.

FIG. 9 illustrates a cross sectional view of an optical fibre cable 900 with a third plus sign shaped ribbon stack 902. The optical fibre cable 900 includes the third plus sign shaped ribbon stack 902, a sheath 904, a plurality of embedded members 906 and a plurality of ripcords 908.

The optical fibre cable 900 includes the third plus sign shaped ribbon stack 902. The third plus sign shaped ribbon stack 902 includes 72 optical fibre ribbons 100. Each optical fibre ribbon 100 of the third plus sign shaped ribbon stack 902 includes 12 optical fibres. Further, the third plus sign shaped ribbon stack 902 has a total number of 864 optical fibres. In another embodiment the third plus sign shaped ribbon stack 902 may be enclosed in the form fitting soft tube 704.

The optical fibre cable 900 includes the plurality of embedded members 906. Each of the plurality of embedded members 906 is a strength member. Further, the optical fibre cable 900 includes the plurality of ripcords 908. In an embodiment of the present disclosure, number of plurality of ripcords is two. In another embodiment of the present disclosure, the number of the plurality of ripcords 908 may vary. In an embodiment of the present disclosure, the plurality of ripcords 908 are placed diagonally opposite to each other in the sheath 904.

The optical fibre ribbon has numerous advantages over the prior art. The optical fibre ribbon is easy to deploy in optical fibre cables. In addition, the optical fibre ribbon stack has reduced height. Moreover, each of the plurality of optical fibre ribbons has high density.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation.

We claim:

1. A method for stacking of a plurality of optical fibre ribbons (106), wherein each optical fibre ribbon (100) of the plurality of optical fibre ribbons (106) is defined by a top surface (S1) and a bottom surface (S2), wherein the top surface (S1) and the bottom surface (S2) are defined by a plurality of elevated regions and a plurality of groove regions, wherein the plurality of elevated regions and the plurality of groove regions are alternate to each other, wherein the method for stacking of the plurality of optical fibre ribbons (106) comprising:

arranging the plurality of optical fibre ribbons (106) over each other such that the plurality of elevated regions of each of the plurality of optical fibre ribbons (106) fits over the plurality of groove regions of an adjacent optical fibre ribbon of the plurality of optical fibre ribbons (106), wherein arrangement of the plurality of optical fibre ribbons (106) forms an optical fibre ribbon stack (200), wherein each of the plurality of optical fibre ribbons (106) is capable of bending along non-preferential axis.

2. The method as claimed in claim 1, wherein the plurality of optical fibre ribbons (106) of the optical fibre ribbon stack (200) is arranged such that each optical fibre ribbon (100) of the plurality of optical fibre ribbons (106) is offset by half value of pitch of each optical fibre ribbon (100) of the plurality of optical fibre ribbons (106).

3. The method as claimed in claim 1, wherein each of the plurality of optical fibre ribbons (106) comprises a plurality of optical fibres (102), wherein each of the plurality of optical fibres (102) is coated with a matrix material (104), wherein the matrix material (104) on each of the plurality of optical fibres (102) is characterised by a radius of curvature, wherein the radius of curvature of the matrix material (104) on each of the plurality of optical fibres (102) in each of the plurality of optical fibre ribbons (106) is same.

4. The method as claimed in claim 1, wherein each of the plurality of optical fibre ribbons (106) has 12 optical fibres.

5. The method as claimed in claim 1, wherein arrangement of the plurality of optical fibre ribbons (106) is dependent of diameter of each of the plurality of optical fibres (102), a radius of curvature of the matrix material (104) and pitch of the plurality of optical fibers (102) in the optical fibre ribbon (106).

6. The method as claimed in claim 1, wherein the optical fibre ribbon stack (200) is characterized by height, wherein height of the optical fibre ribbon stack (200) is 3170 micrometers.

\* \* \* \* \*